(12) United States Patent
Bock et al.

(10) Patent No.: US 8,882,044 B2
(45) Date of Patent: Nov. 11, 2014

(54) GAP COVERING DEVICE

(75) Inventors: Thomas Bock, Grenade (FR); Michael Auburger, Erlenmoos (DE); Patrique Doemeland, Buxtehude (DE); Brigitte Gerner, Laupheim (DE); Florian Schuephaus, Hamburg (DE); Silvan Fiedler, Ulm (DE)

(73) Assignees: Airbus Operations GmbH, Hamburg (DE); Airbus S.A.S., Blagnac Cedex (FR)

( * ) Notice: Subject to any disclaimer, the term of this patent is extended or adjusted under 35 U.S.C. 154(b) by 861 days.

(21) Appl. No.: 12/532,343

(22) PCT Filed: Mar. 25, 2008

(86) PCT No.: PCT/EP2008/002353
§ 371 (c)(1),
(2), (4) Date: Mar. 3, 2010

(87) PCT Pub. No.: WO2008/113612
PCT Pub. Date: Sep. 25, 2008

(65) Prior Publication Data
US 2010/0176242 A1 Jul. 15, 2010

Related U.S. Application Data

(60) Provisional application No. 60/896,293, filed on Mar. 22, 2007.

(30) Foreign Application Priority Data

Mar. 22, 2007 (DE) .......................... 10 2007 013 904

(51) Int. Cl.
*B64D 11/00* (2006.01)
*B64C 1/06* (2006.01)

(52) U.S. Cl.
CPC ...................................... *B64C 1/066* (2013.01)
USPC .......................................................... 244/131

(58) Field of Classification Search
USPC .............. 244/118.5, 131, 129.1; 24/297, 457, 24/581.11, 591.1
See application file for complete search history.

(56) References Cited

U.S. PATENT DOCUMENTS

| 4,050,208 A | 9/1977 | Pompei et al. | |
| 4,067,155 A * | 1/1978 | Ruff et al. | 52/105 |

(Continued)

FOREIGN PATENT DOCUMENTS

| DE | 102004049893 | 4/2006 |
| JP | 2002-115357 A | 4/2002 |

OTHER PUBLICATIONS

International Search Report Forms: PCT/ISA/220, PCT/ISA/210, PCT/ISA/237, mailing date of Oct. 17, 2008.

(Continued)

*Primary Examiner* — Brian M O'Hara
(74) *Attorney, Agent, or Firm* — Wood, Herron & Evans, LLP

(57) ABSTRACT

A gap covering device for covering a gap between two mutually adjacent first aircraft interior panels includes a visible portion as well as a retaining portion connected to the visible portion and extending opposite the visible portion. A receiving structure is fastened to an inner surface of the visible portion and/or of the retaining portion and has a receiving contour adapted to an edge contour of the first aircraft interior panels.

11 Claims, 6 Drawing Sheets

(56) References Cited

U.S. PATENT DOCUMENTS

| | | | |
|---|---|---|---|
| 4,356,672 A * | 11/1982 | Beckman et al. | 52/36.6 |
| 6,345,480 B1 | 2/2002 | Kemper et al. | |
| 6,874,730 B2 * | 4/2005 | Harasta | 244/118.5 |
| 7,478,781 B2 | 1/2009 | Granzeier et al. | |
| 8,312,681 B2 * | 11/2012 | Mouton | 52/208 |
| 2004/0021039 A1 | 2/2004 | Jones | |
| 2006/0102786 A1 | 5/2006 | Granzeier et al. | |
| 2007/0227089 A1 * | 10/2007 | Lewis et al. | 52/468 |

OTHER PUBLICATIONS

Examiner's Report issued by the Canadian Patent Office in corresponding Application No. 2,684,629, May 8, 2014.

Second Office Action issued by the Chinese Patent Office in corresponding application No. 200880016843.3 issued Mar. 5, 2013.

* cited by examiner

GAP COVERING DEVICE

CROSS-REFERENCE TO RELATED APPLICATIONS

This application claims the benefit of International Application No. PCT/EP2008/002353 filed Mar. 25, 2008; which claims priority to German Application No. DE 10 2007 013 904.9 filed on Mar. 22, 2007, to U.S. Application No. 60/896,293 filed Mar. 22, 2007.

TECHNICAL FIELD

The invention relates to a gap covering device for covering a gap between two mutually adjacent first aircraft interior components as well as to an aircraft interior component group comprising such a gap covering device.

BACKGROUND

The interior trim of an aircraft passenger cabin comprises a plurality of individual panels, such as for example side panels, ceiling panels, etc. During assembly of the cabin interior trim, the individual interior trim panels are fastened to an aircraft structure. A bottom portion of the cabin side walls is generally lined by a row of juxtaposed first side panels, in which suitable window- or door apertures may also be formed. For lining a portion of the cabin side walls that remains between the first side panels and the luggage compartments disposed above the seat rows there is provided a row of juxtaposed second side panels, which may for example also carry components of the cabin lighting. As an edge of the first side panels that faces the second side panels lies in the field of vision of persons standing in the aisle of the aircraft cabin, it is particularly important for this edge to be aligned straight. Gaps that exist between two adjacent first side panels should moreover, particularly in the region of the edge of the first side panels that faces the second side panels, as far as possible have no irregularities at all. Assembly of the first side panels is therefore relatively elaborate.

The present invention is directed to the problem of providing a gap covering device for covering a gap between two mutually adjacent first aircraft interior components, which device makes it possible to cover and/or compensate minor faults in the alignment of an edge of the aircraft interior components as well as minor irregularities of the gap between the components that exist in the region of the edge of the aircraft interior components. The present invention is moreover geared to the problem of providing an aircraft interior component group that comprises such a gap covering device.

SUMMARY OF THE INVENTION

This problem is solved by a gap covering device having the features of described below as well as by an aircraft interior component group having the features described below.

A gap covering device according to the invention for covering a gap between two mutually adjacent first aircraft interior components comprises a visible portion, the outer surface of which in the state of assembly of the gap covering device in an aircraft cabin forms a large part of the visible surface of the gap covering device. A retaining portion of the gap covering device according to the invention is connected to the visible portion and extends preferably substantially parallel to the visible portion opposite the visible portion. The gap covering device according to the invention moreover comprises a receiving structure, which is fastened to an inner surface of the visible portion and/or of the retaining portion and has a receiving contour that is adapted to an edge contour of the first aircraft interior components disposed adjacent to one another.

The gap covering device according to the invention may therefore be slipped, in the region of the gap between the two mutually adjacent first aircraft interior components, over an edge of the first aircraft interior components until the edge of the first aircraft interior components is received in the receiving structure of the gap covering device. In this way, minor faults in the alignment of the edge of the first aircraft interior components as well as minor irregularities of the gap between the components that exist in the region of the edge of the aircraft interior components may be compensated or at least covered. The gap covering device according to the invention therefore makes it possible to simplify the assembly of the first interior components in an aircraft cabin.

The receiving structure of the gap covering device according to the invention preferably comprises at least one first web that extends between the inner surface of the visible portion and the inner surface of the retaining portion of the gap covering device. The first web may be fastened to the inner surface of the visible portion and/or the inner surface of the retaining portion. Preferably, the first web comprises a receiving edge that has a contour adapted to the edge contour of the first aircraft interior components. In a particularly preferred embodiment of the gap covering device according to the invention, the receiving structure comprises a plurality of such first webs, wherein at least two first webs are provided for receiving in each case the edge of one of the two mutually adjacent first aircraft interior components.

Instead of the at least one first web, the receiving structure of the gap covering device according to the invention may however comprise a receiving body having a receiving surface, the contour of which is adapted to the edge contour of the first aircraft interior components. A gap covering device, which has a receiving structure comprising at least one first web, is however notable for weighing less than a gap covering device having a receiving structure comprising a receiving body.

The gap covering device according to the invention preferably further comprises a gap distance adjusting device, which is fastened to the inner surface of the visible portion and/or the inner surface of the retaining portion of the gap covering device. A width of the gap distance adjusting device is adapted to a desired width of the gap between the two mutually adjacent first aircraft interior components. The gap distance adjusting device of the gap covering device according to the invention therefore enables easy and reliable adjustment of the width of the gap between the first aircraft interior components in the region of the edge of the interior components. This is advantageous particularly when the edge region of the first aircraft interior components lies in the field of vision of persons standing in the aisle of the aircraft cabin or in the field of vision of persons occupying the seats.

The gap distance adjusting device of the gap covering device according to the invention preferably comprises two second webs, which are disposed substantially parallel to one another and fastened for example to an inner surface of the visible portion of the gap covering device. A distance between the second webs disposed substantially mutually parallel to one another is preferably adapted to the desired width of the gap between the two mutually adjacent first aircraft interior components.

Alternatively, the gap distance adjusting device may comprise a substantially cuboidal body, which is fastened to the inner surface of the visible portion and/or the inner surface of the retaining portion of the gap covering device and the width of which is adapted to the desired width of the gap between the first aircraft interior components. A gap covering device, which has a gap distance adjusting device formed by two second webs disposed substantially parallel to one another, is however notable for weighing less than a gap covering device, which has a gap distance adjusting device formed by a substantially cuboidal body.

In a preferred embodiment of the gap covering device according to the invention, a recess is formed in a surface of the retaining portion of the gap covering device facing away from the visible portion. A surface contour of this recess is adapted to a contour of a visible surface portion, i.e. a contour of a portion of a visible outer surface of at least one second aircraft interior component, which is to be disposed adjacent to the first aircraft interior components. The gap covering device according to the invention then makes it possible to cover a connection point between the two first aircraft interior components and the at least one second aircraft interior component. The interaction of the recess formed in the surface of the retaining portion of the gap covering device with the corresponding visible surface portion of the at least one second aircraft interior component moreover facilitates the alignment and final adjustment of the at least one second aircraft interior component in its position in the aircraft cabin. Finally, a gap covering device having a recess formed in a surface of the retaining portion makes it possible to compensate minor irregularities in the alignment of the at least one second aircraft interior component.

The surface contour of the recess formed in the surface of the retaining portion of the gap covering device according to the invention facing away from the visible portion is preferably adapted to a contour of two visible surface portions of two mutually adjacent second aircraft interior components. The gap covering device according to the invention may then advantageously be employed at a connection Is point between two first and two second aircraft interior components in order to compensate and/or at least cover minor faults and/or irregularities in the alignment of these components.

The gap covering device according to the invention preferably comprises a fastening device that is adapted so as to fasten the gap covering device detachably to the mutually adjacent first aircraft interior components. In principle, any desired fastening device that allows a detachable fastening of the gap covering device to the mutually adjacent first aircraft interior components may be used.

The fastening device however preferably comprises a first detent portion, which is attached to the retaining portion of the gap covering device and adapted so as to interact with complementary second detent portions that are attachable to the mutually adjacent first aircraft interior components. The first detent portion attached to the retaining portion of the gap covering device may be of an integral design and adapted so as to interact with two second detent portions, wherein one second detent portion is attachable to each of the two mutually adjacent first aircraft interior components. Alternatively, however, the first detent portion may be of a two-part design so that each part of the detent portion is adapted so as to interact in each case with a complementary second detent portion that is attachable to a first aircraft interior component. A fastening device designed in the form of a detent device allows easy and secure assembly of the gap covering device according to the invention on the mutually adjacent first aircraft interior components.

The first detent portion of the fastening device preferably comprises a resiliently yielding detent arm, from which at least one detent lug extends. The first detent portion is made preferably of a plastics material and may for example be formed integrally with the other components of the gap covering device according to the invention, which are made of the same material.

The second detent portions that are provided for the fastening to the mutually adjacent first aircraft interior components may comprise in each case a tooth system that is adapted so as to interact with the first detent portion, i.e. for example the detent lug provided on the first detent portion. The tooth system is preferably designed in such a way that it enables an interaction with the first detent portion, i.e. the detent lug formed on the first detent portion, in various positions. Once the second detent portions are attached to the two mutually adjacent first aircraft interior components, the gap covering device according to the invention may thus be fastened in various positions to the two mutually adjacent first aircraft components. This facilitates the compensating and/or covering of irregularities in the region of the edge of the first aircraft interior components and/or in the region of the gap formed between the components.

The tooth system of the second detent portions that allows the first detent portion attached to the gap covering device to be fastened in various fastening positions preferably comprises a plurality of detent ribs that are disposed substantially parallel to one another, so that the detent lug of the first detent portion may engage behind a desired detent rib and hence realize a fastening of the gap covering device to the two mutually adjacent first aircraft interior components in the desired position.

The gap covering device according to the invention preferably comprises a release clip, which is fastened to the first detent portion and the actuation of which allows the first detent portion to be released from the complementary second detent portions. The release clip preferably extends far enough from the first detent portion to project beyond an edge of the visible portion of the gap covering device. In the state of assembly of the gap covering device on the first aircraft interior components, the release clip moreover extends in the region of the gap between the first aircraft interior components. In order to detach the first detent portion from the second detent portion and hence detach the gap covering device according to the invention from the mutually adjacent first aircraft interior components, in a simple and convenient manner the release clip disposed in the region of the gap between the two mutually adjacent first aircraft interior components may be pressed and the gap covering device may then be withdrawn from the edge of the mutually adjacent first aircraft interior components. A detent device provided with a release clip therefore allows particularly easy and convenient disassembly of the gap covering device according to the invention from the two mutually adjacent first aircraft interior components.

An aircraft interior component group according to the invention comprises two mutually adjacent first aircraft interior components as well as a gap covering device as described above, which in the region of a gap between the two mutually adjacent first aircraft interior components receives an edge of the two mutually adjacent first aircraft interior components.

The aircraft interior component group according to the invention moreover preferably comprises at least one second aircraft interior component disposed adjacent to the first aircraft interior components and having a visible surface portion, which is received in the recess formed in the surface of the retaining portion of the gap covering device facing away from the visible portion. Alternatively, the aircraft interior component group according to the invention may comprise two mutually adjacent second aircraft interior components, wherein a gap between the two mutually adjacent second aircraft interior components extends in an extension of the gap between the two mutually adjacent first aircraft interior components.

An infill strip is preferably introduced into the gap between the mutually adjacent first aircraft interior components and/or into the gap between the two mutually adjacent second aircraft interior components. The infill strip is used to close the gap, this having a visually advantageous effect and moreover preventing dirt or the like from penetrating into the gap.

BRIEF DESCRIPTION OF THE DRAWINGS

There now follows a detailed description of two preferred embodiments of the gap covering device according to the invention with reference to the accompanying diagrammatic figures, which show.

DETAILED DESCRIPTION

Figure 1:
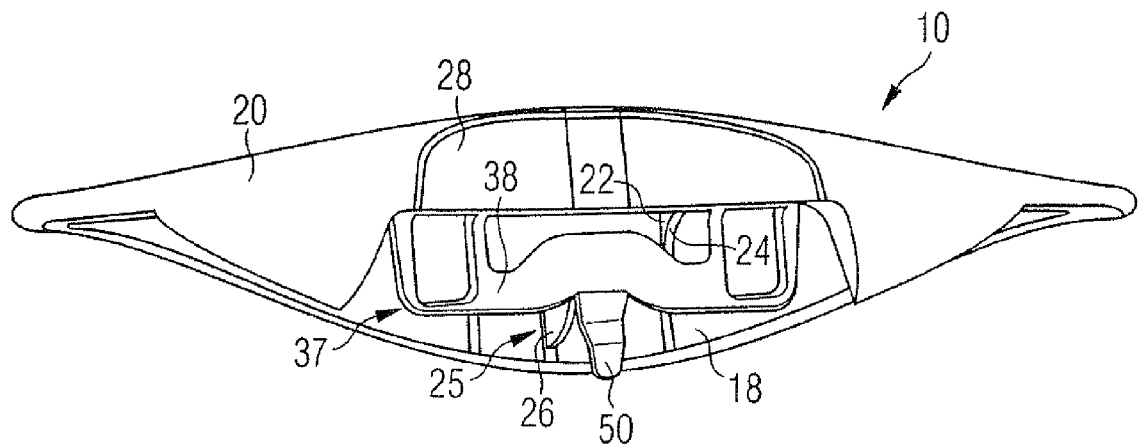
FIG. 1 a three-dimensional rear view of a first embodiment of a gap covering device according to the invention, FIG. 2 a three-dimensional front view of the gap covering device according to FIG. 1 in the state of assembly on two mutually adjacent first aircraft interior components, FIG. 3 a three-dimensional rear view of the gap covering device according to FIG. 1 in the state of assembly on two mutually adjacent first aircraft interior components, FIG. 4 a representation as in FIG. 3 with an infill strip covering the gap between the two mutually adjacent first aircraft interior components, FIG. 5 a three-dimensional representation of the gap covering device according to FIG. 1 during assembly on the two mutually adjacent first aircraft interior components, FIG. 6 the representation according to FIG. 5 in a part-sectional view, FIG. 7 the representation according to FIG. 5 in a part-sectional side view, FIG. 8 a three-dimensional representation of the gap covering device according to FIG. 1 in the state of assembly on two mutually adjacent first aircraft interior components in a part-sectional side view, FIG. 9 the gap covering device according to FIG. 1 in the state of assembly in an aircraft cabin, FIG. 10 a detail of an aircraft cabin with three gap covering devices according to FIG. 1, and FIG. 11 a three-dimensional rear view of a second embodiment of a gap covering device according to the invention.
Figure 2:
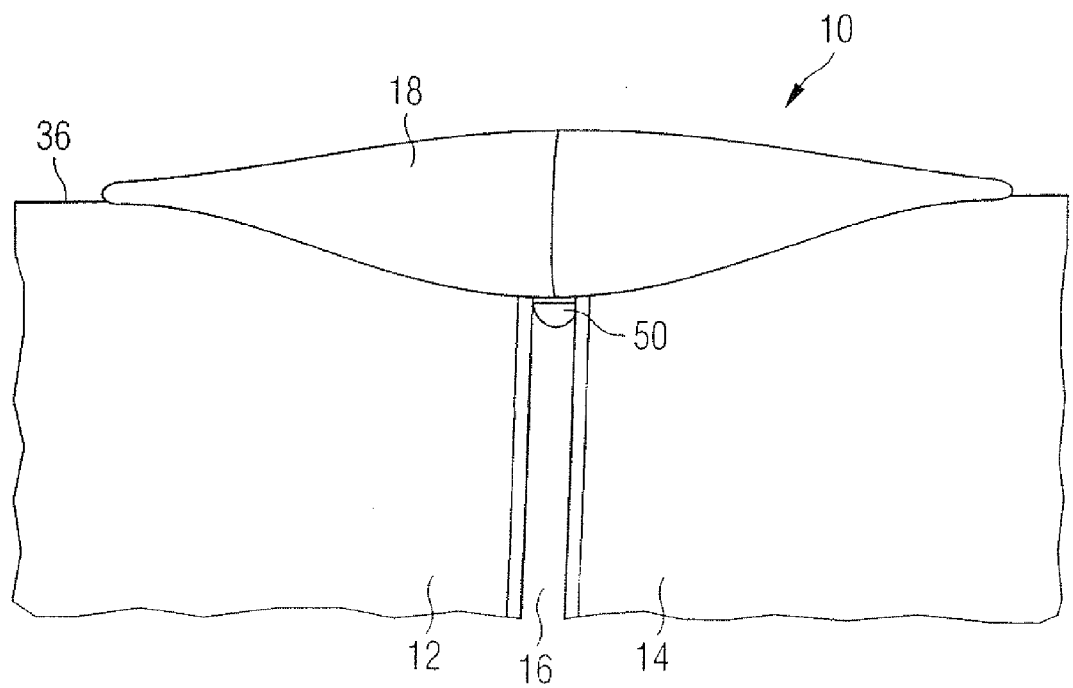
Figure 3:
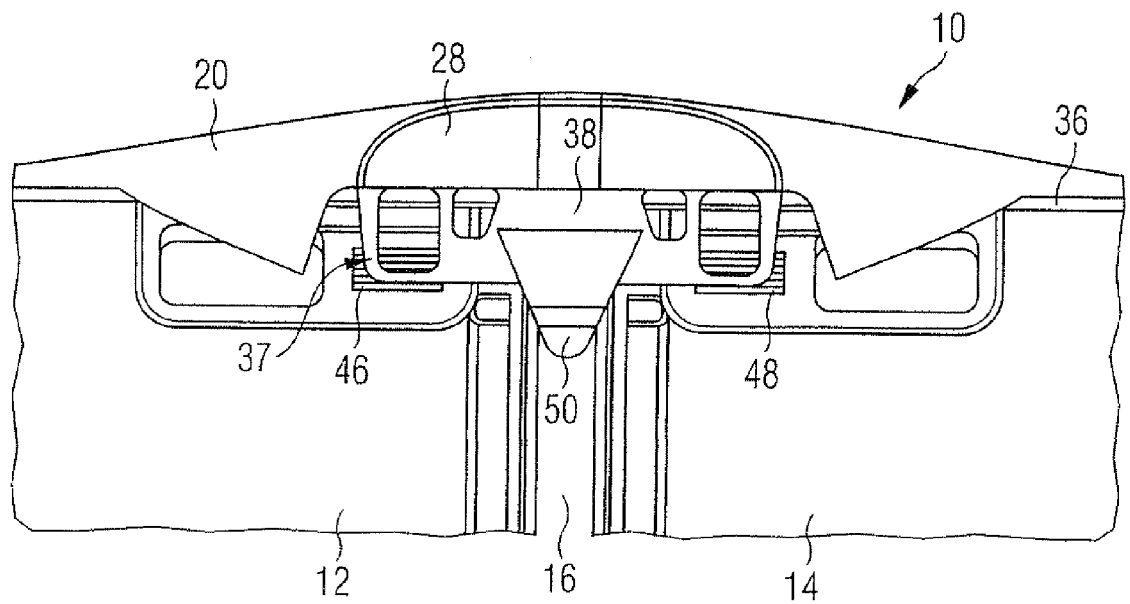
Figure 4:
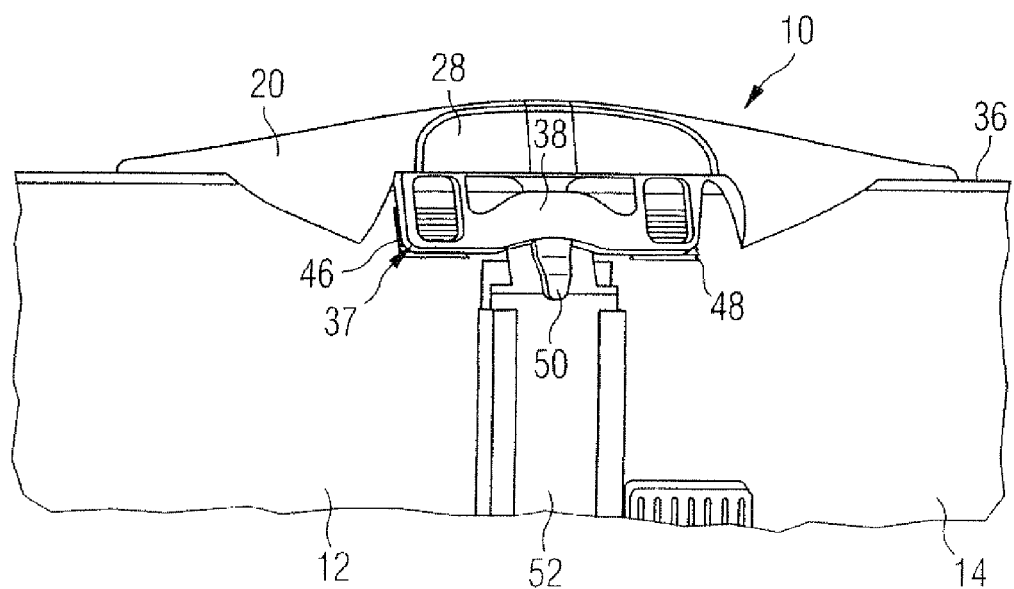

A gap covering device 10 shown in FIGS. 1 to 10 is used to cover a gap 16 between two first aircraft interior components 12, 14. The gap covering device 10 comprises a visible portion 18, which in the state of assembly of the gap covering device 10 on the first aircraft interior components 12, 14 in an aircraft cabin (see FIGS. 2, 9 and 10) forms a visible region of the gap covering device 10. Extending substantially parallel to the visible portion 18 opposite the visible portion 18 is a retaining portion 20, which is connected to the visible portion 18 and in the state of assembly of the gap covering device 10 on the first aircraft interior components 12, 14 in the aircraft cabin (see FIGS. 2, 9 and 10) forms a non-visible region of the gap covering device 10. The visible portion 18 of the gap covering device 10 has a curved external contour, as does the retaining portion 20.

Figure 6:
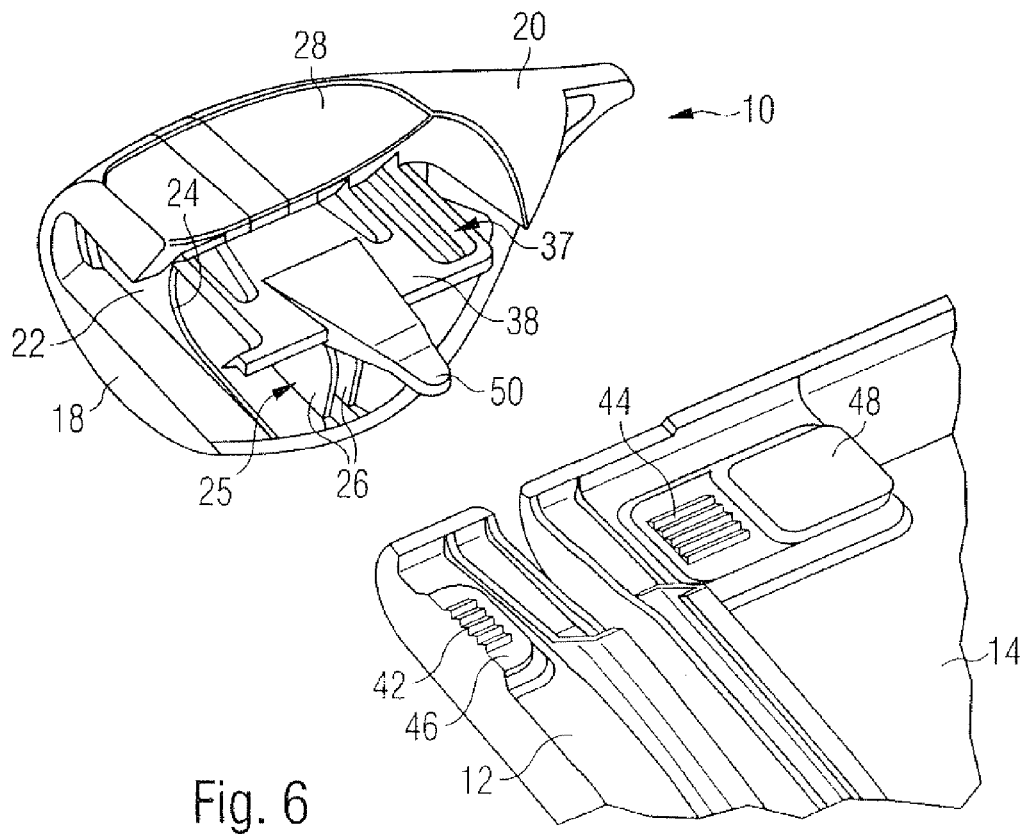
Figure 7:
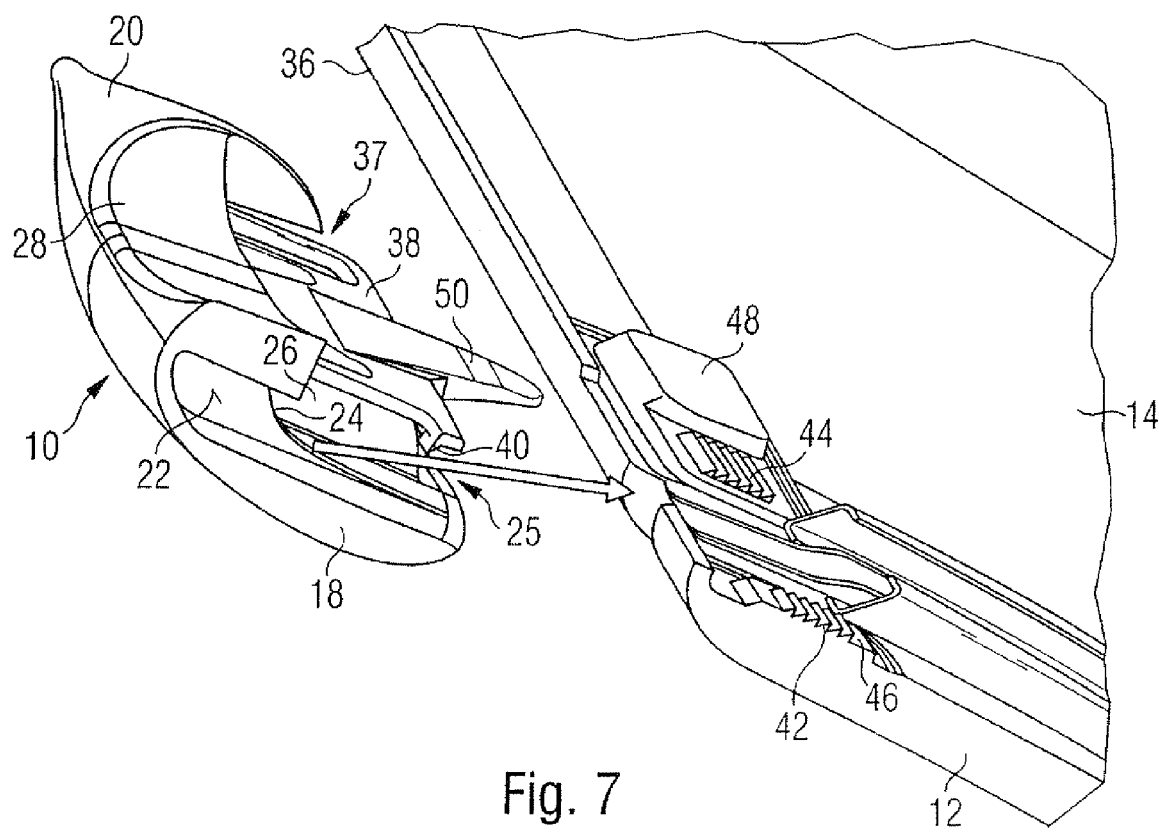
Figure 8:
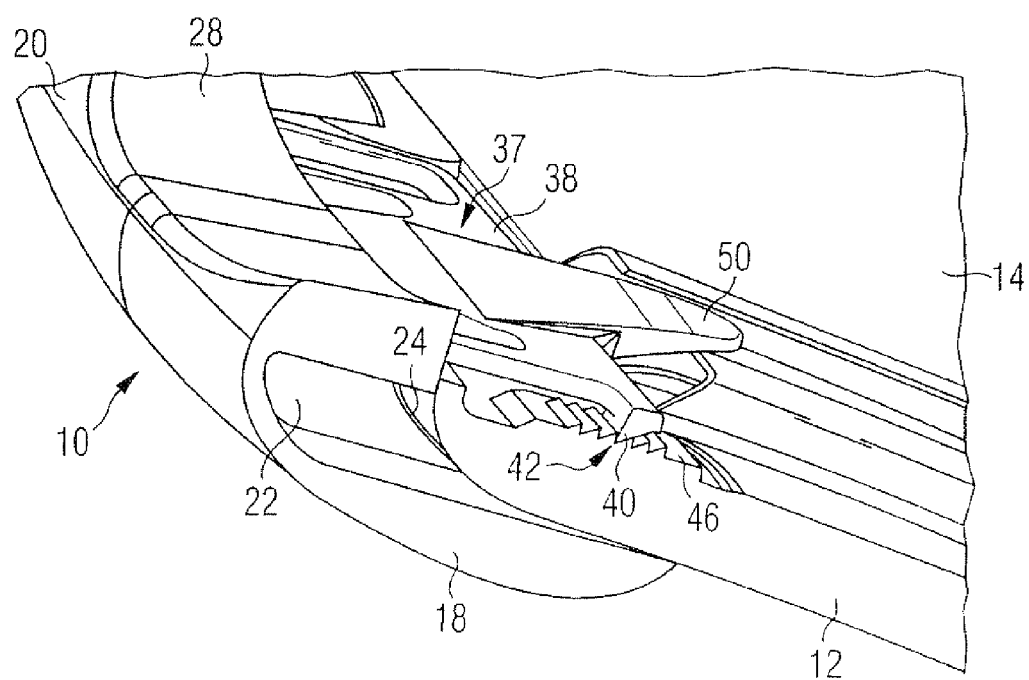

As may best be seen from FIGS. 6, 7 and 8, the gap covering device 10 comprises a receiving structure, which is formed by a plurality of first webs 22 disposed substantially parallel to one another. The first webs 22 extend between an inner surface of the visible portion 18 and an inner surface of the retaining portion 20 and have a receiving edge 24, the contour of which is adapted to an edge contour of the first aircraft interior components 12, 14. In the gap covering device 10, the first webs 22 are fastened both to the inner surface of the visible portion 18 and to the inner surface of the retaining portion 20. Alternatively, however, the first webs 22 may be attached only to the inner surface of the visible portion 18 or to the inner surface of the retaining portion 20.

Figure 5:
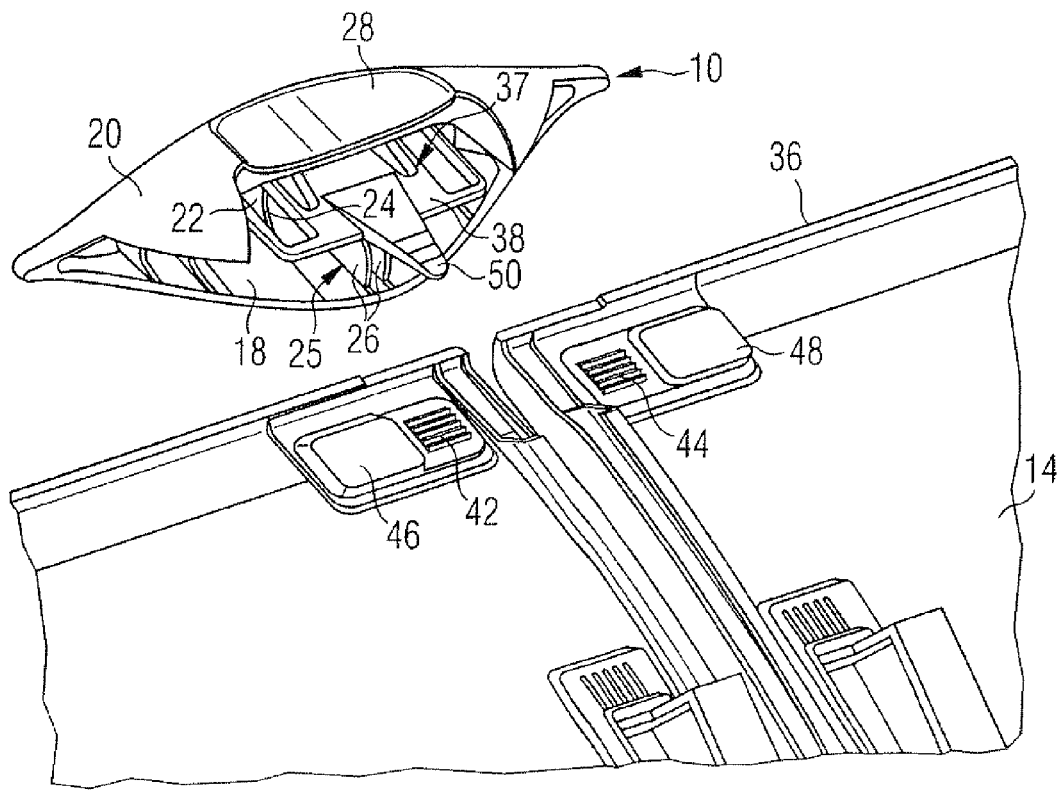

The gap covering device 10 further comprises a gap distance adjusting device 25, which is evident in particular from FIGS. 5 and 6 and is formed by two second webs 26 disposed parallel to one another. The second webs 26 extend from the inner surface of the visible portion 18 in the direction of the retaining portion 20 and are at a distance from one another that is adapted to a desired width of the gap 16 between the first aircraft interior components 12, 14.

As is evident from FIGS. 1 and 3 to 8, in a surface of the retaining portion 20 facing away from the visible portion 18, i.e. in an outer surface of the retaining portion 20, a recess 28 is formed. As FIG. 9 particularly reveals, a surface contour of the recess 28 is adapted to a contour of two visible surface portions, i.e. two portions of a visible outer surface of two mutually adjacent second aircraft interior components 30, 32.

Figure 10:
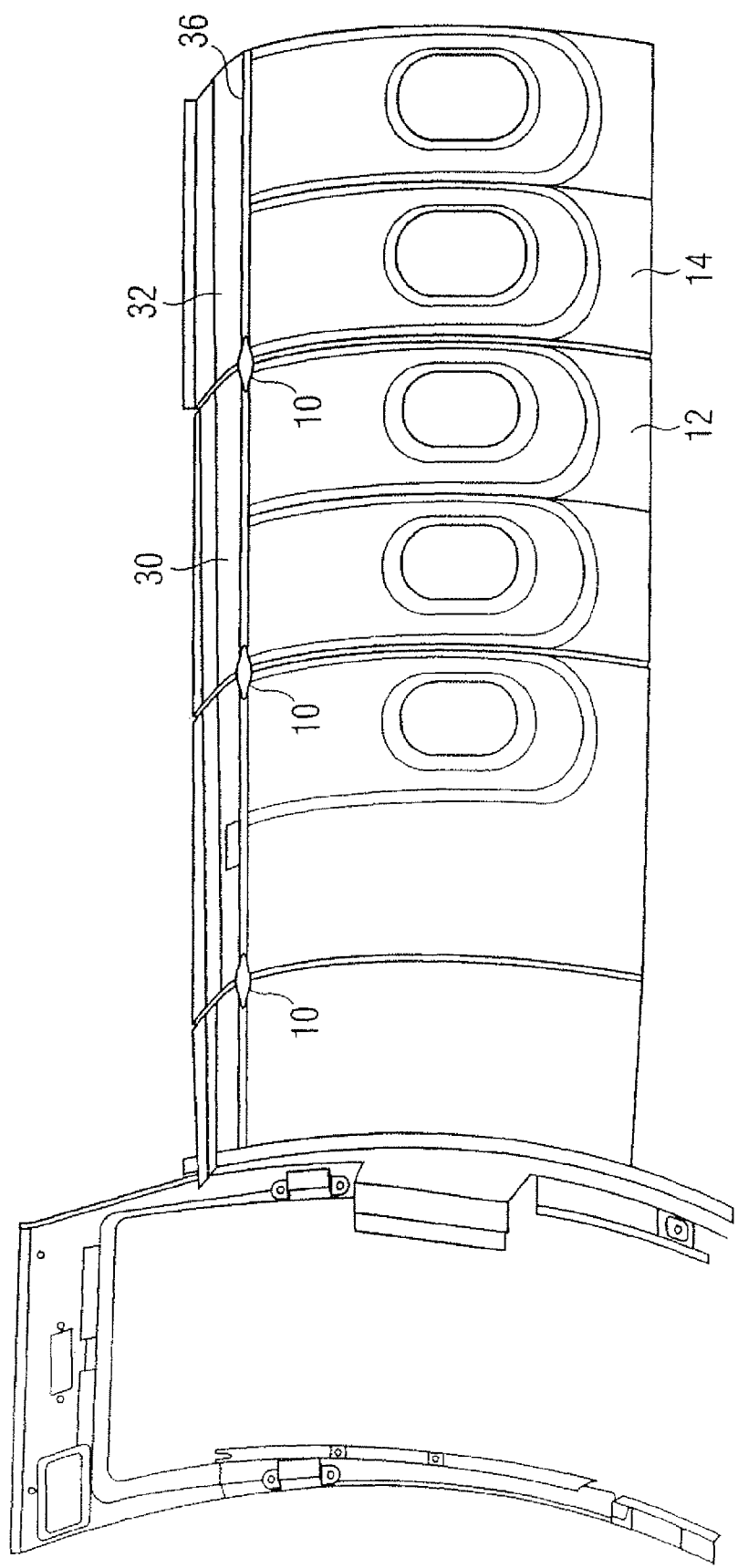

In the state of assembly in the aircraft cabin, the first aircraft interior components 12, 14 serve as side panels that are provided with window apertures, while the second aircraft interior components 30, 32 are used to line a portion of the cabin side wall that extends between the first aircraft interior components 12, 14 and luggage compartments disposed above seat rows (see FIG. 10). A gap 34 between two mutually adjacent second aircraft interior components 30, 32 extends in an extension of the gap 16 between two mutually adjacent aircraft interior components 12, 14. In an aircraft interior component group, which comprises two mutually adjacent first aircraft interior components 12, 14, two second aircraft interior components 30, 32 disposed adjacent to one another and to the first interior components 12, 14, and a gap covering device 10, the gap covering device 10 is therefore disposed in the region of an edge 36 of the first interior components 12, 14 that faces the second interior components 30, 32 at the connection point between the first and second interior components 12, 14, 30, 32.

For fastening the gap covering device 10 to the first aircraft interior components 12, 14 the gap covering device 10 comprises a first detent portion 37 having a resiliently yielding detent arm 38, which is fastened to the retaining portion 20 of the gap covering device 10. The resiliently yielding detent arm 38 of the gap covering device 10 is made of a plastics material, as are the other components of the gap covering device 10.

As may best be seen from FIGS. 7 and 8, from the detent arm 38 two detent lugs 40 extend, which, when the gap covering device 10 is fastened to the first aircraft interior components 12, 14, interact with a tooth system 42, 44 of two second detent portions 46, 48, which are fastened to the first interior components 12, 14. In order to guarantee a correct fastening of the gap covering device 10 to the two first aircraft interior components 12, 14, a second detent portion 46, 48 having a tooth system 42, 44 is fastened to each of the two interior components 12, 14. The tooth system 42, 44 of the second detent portions 46, 48 is formed by a plurality of detent ribs extending substantially parallel to one another. The detent lugs 40 of the first detent portion 37 fastened to the gap covering device 10 may therefore latch in different positions with the tooth system 42, 44 of the second detent portions 46, 48.

A release clip 50 is moreover fastened to the first detent portion 37 of the gap covering device 10. As is evident in particular from FIGS. 2 and 3, once the gap covering device 10 has been fastened to the first interior components 12, 14, the release clip 50 extends beyond a bottom edge of the visible portion 18 of the gap covering device 10 into the gap 16 formed between the mutually adjacent first aircraft interior components 12, 14. By applying pressure to the release clip 50, the detent lugs 40 attached to the detent arm 38 of the first detent portion 37 may be moved out of engagement with the tooth system 42, 44 of the second detent portions 46, 48.

In the assembled state of the first aircraft interior components 12, 14 and the gap covering device 10 in the aircraft cabin, the gap 16 between the mutually adjacent first interior components 12, 14 is covered by means of an infill strip 52. In a similar manner, the gap 34 between the mutually adjacent second aircraft interior components 30, 32 is covered by means of an infill strip 54. By means of the infill strips 52, 54 the visual appearance of the aircraft interior component group is improved. What is more, dirt or the like is prevented from penetrating into the gaps 16, 34 between the first aircraft interior components 12, 14 and the second interior components 30, 32.

As may best be seen in FIGS. 5 to 8, the gap covering device 10 during assembly on the first aircraft interior components 12, 14 in the region of the gap 16 between the first interior components 12, 14 is pushed over the edge 36 of the first aircraft interior components 12, 14 until the first edge 36 of the first aircraft interior components 12, 14 lies against the receiving edge 24 of the first webs 22. The alignment of the gap covering relative to the two first aircraft interior components 12, 14 is effected in such a way that the two second webs 26 forming the gap distance adjusting device 25 are received in the gap 16 formed between the two interior components 12, 14. Once the gap covering device 10 is positioned in such a way that the edge 36 of the first interior components 12, 14 lies securely against the receiving edge 24 of the first webs 22, the detent lugs 40 formed on the first detent portion 37 of the gap covering device 10 latch in the desired position in the tooth system 42, 44 of the second detent portions 46, 48 fastened to the first interior components 12, 14.

Figure 9:
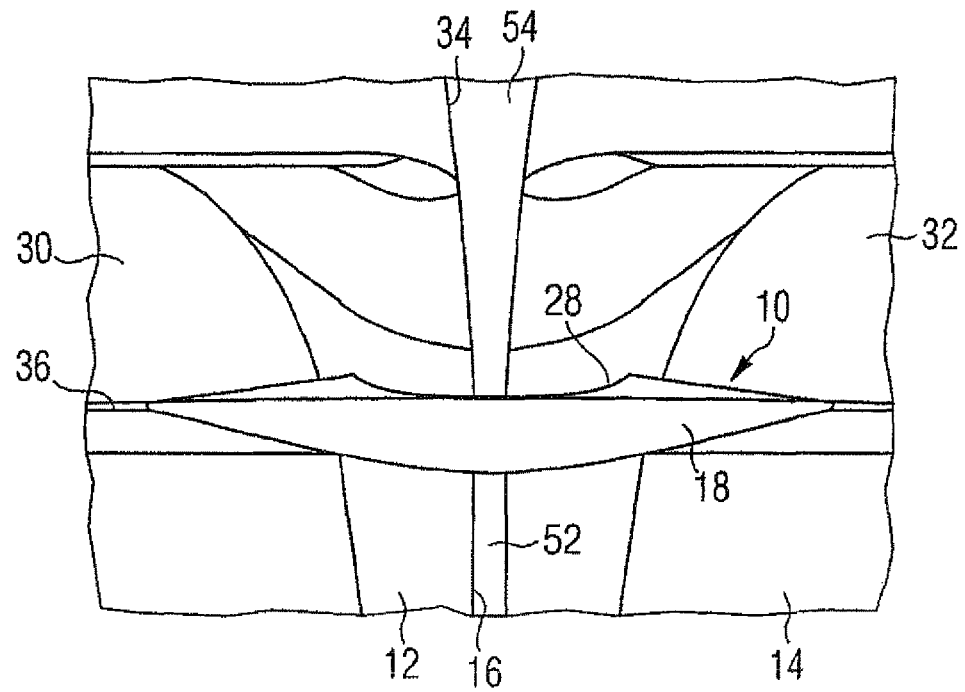

As is evident in particular from FIG. 9, in the assembled state of the gap covering device 10 in the aircraft cabin visible surface portions of the second aircraft interior components 30, 32 lie against a surface of the recess 28 formed in the surface of the retaining portion 20 of the gap covering device 10 facing away from the visible portion 18. The gap covering device 10 therefore makes it possible to compensate or at least cover minor faults in the alignment of the edge 36 of the first aircraft interior components 12, 14 as well as minor irregularities in the adjustment of the gaps 16, 34 between the first interior components 12, 14 and/or the second interior components 30, 32.

In order to disassemble the gap covering device 10, the infill strip 52 first has to be removed from the gap 16 between the two mutually adjacent first aircraft interior components 12, 14. Pressure may then be applied to the release clip 50 in order to release the detent lugs 40 of the first detent portion 37 from the tooth system 42, 44 of the second detent portions 46, 48. After release of the detent connection between the gap covering device 10 and the first interior components 12, 14, the gap covering device 10 may easily and conveniently be withdrawn from the edge 36 of the first interior components 12, 14 and hence detached from the first interior components 12, 14.

Figure 11:
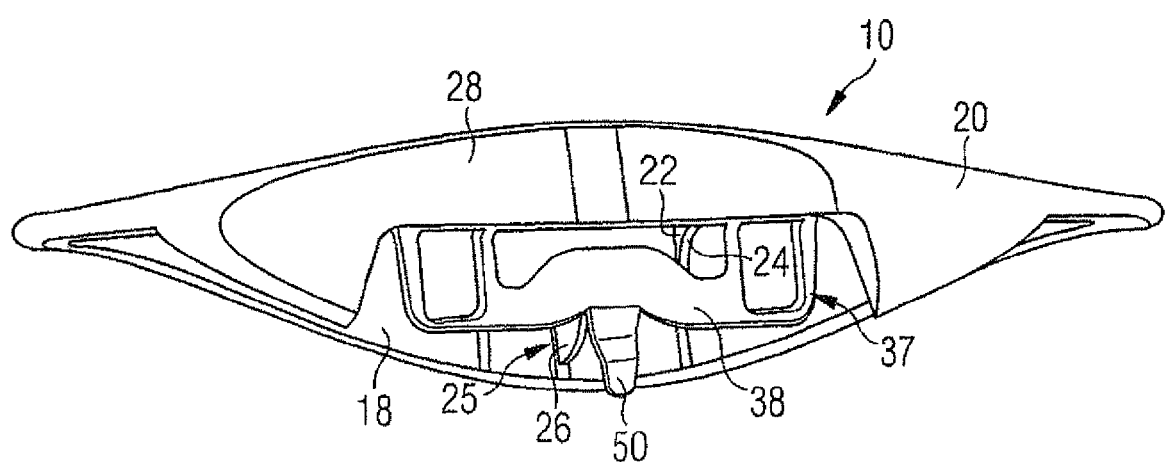

The gap covering device 10 represented in FIG. 11 differs from the component shown in FIGS. 1 to 10 in the shape of the recess 28 formed in the surface of the retaining portion 20 facing away from the visible portion 18. The recess 28 of the is gap covering device 10 according to FIG. 11 is suitable for interacting with differently shaped visible surface portions of two mutually adjacent second aircraft interior components. Otherwise, the construction and mode of operation of the gap covering device according to FIG. 11 corresponds to the construction and mode of operation of the component shown in FIGS. 1 to 10.

The invention claimed is:

1. A gap covering device for covering a gap formed between two mutually adjacent first aircraft interior panels lining an interior of an aircraft, the first aircraft interior panels including first edges facing one another to define the gap and second edges that adjoin to the corresponding first edges and extend transversely away from the corresponding first edges and one another, the first and second edges being visible from the interior of the aircraft, and the device comprising:
   a visible portion facing towards the interior of the aircraft after installation,
   a retaining portion connected to the visible portion and extending opposite the visible portion, the retaining portion sized to abut and latch into engagement with the first aircraft interior panels adjacent to the corresponding second edges to thereby maintain the gap covering device in a position covering the gap between the corresponding first edges after installation,
   a receiving structure, which is fastened to at least one of an inner surface of the visible portion and an inner surface of the retaining portion, and has a receiving contour adapted to a contour of the second edges of the first aircraft interior panels such that the receiving structure receives the second edges of the first aircraft interior panels after installation, and
   a fastening device adapted to fasten the gap covering device detachably to the mutually adjacent first aircraft interior panels during installation, wherein the fastening device comprises a first detent portion, which is attached to the retaining portion of the gap covering device and is adapted so as to latch into engagement with complementary second detent portions attached to the second edges of the mutually adjacent first aircraft interior panels, and wherein the first detent portion comprises a resiliently yielding detent arm, the resiliently yielding detent arm including at least one detent lug and the second detent portions including detent teeth shaped with complementary shapes such that the at least one detent lug latches into adjustable engagement with the detent teeth to bring the retaining portion into engagement with the first aircraft interior panels,
   wherein the gap covering device is independent and distinct from the first aircraft interior panels and is separately installed at the first aircraft interior panels.

2. The gap covering device according to claim 1, wherein the receiving structure comprises at least one first web, which extends between the inner surface of the visible portion and the inner surface of the retaining portion and has a receiving edge defining said contour adapted to the edge contour of the first aircraft interior panels.

3. The gap covering device according to claim 1, further comprising:
   a gap distance adjusting device, which is fastened to at least one of the inner surface of the visible portion and the inner surface of the retaining portion, and has a width adapted to a desired width of the gap between the two mutually adjacent first aircraft interior panels.

4. The gap covering device according to claim 3, wherein the gap distance adjusting device comprises two second webs disposed substantially parallel to one another, wherein the two second webs are adapted to the desired width of the gap between the first edges of the two mutually adjacent first aircraft interior panels.

5. The gap covering device according to claim 1, wherein a recess is formed in a surface of the retaining portion facing away from the visible portion, the surface contour of which is adapted to a contour of a visible surface portion of at least one second aircraft interior panel, the recess being shaped such that the at least one second aircraft interior panel is received in the recess and abuts the retaining portion after installation of the gap covering device.

6. The gap covering device according to claim 5, wherein the surface contour of the recess is adapted to a contour of two visible surface portions of two mutually adjacent second aircraft interior panels.

7. The gap covering device according to claim 1, further comprising:
   a release clip, which is fastened to the first detent portion and the actuation of which causes the first detent portion to resiliently yield away from the second detent portions to be released from the complementary second detent portions.

8. An aircraft interior component group, comprising:
   two mutually adjacent first aircraft interior panels lining an interior of an aircraft, the first aircraft interior panels including first edges facing one another to define a gap and second edges that adjoin to the corresponding first edges and extend transversely away from the corresponding first edges and one another, the first and second edges being visible from the interior of the aircraft, and
   a gap covering device, further comprising:
      a visible portion facing towards the interior of the aircraft after installation, a retaining portion connected to the visible portion and extending opposite the visible portion, the retaining portion sized to abut and latch into engagement with the first aircraft interior panels adjacent to the corresponding second edges to thereby maintain the gap covering device in a position covering the gap between the corresponding first edges after installation,
      a receiving structure, which is fastened to at least one of an inner surface of the visible portion and an inner surface of the retaining portion, and has a receiving contour adapted to a contour of the second edges of the first aircraft interior panels such that the receiving structure receives the second edges of the first aircraft interior panels after installation, and
      a fastening device adapted to fasten the gap covering device detachably to the mutually adjacent first aircraft interior panels during installation, wherein the fastening device comprises a first detent portion, which is attached to the retaining portion of the gap covering device and is adapted so as to latch into engagement with complementary second detent portions attached to the second edges of the mutually adjacent first aircraft interior panels, and wherein the first detent portion comprises a resiliently yielding detent arm, the resiliently yielding detent arm including at least one detent lug and the second detent portions including detent teeth shaped with complementary shapes such that the at least one detent lug latches into adjustable engagement with the detent teeth to bring the retaining portion into engagement with the first aircraft interior panels,
   wherein the gap covering device is independent and distinct from the first aircraft interior panels and is separately installed at the first aircraft interior panels.

9. The aircraft interior component group according to claim 8, wherein the gap covering device further comprises:
   a release clip, which is fastened to the first detent portion and the actuation of which causes the first detent portion to resiliently yield away from the second detent portions to be released from the complementary second detent portions.

10. The aircraft interior component group according to claim 8, further comprising:
   an infill strip that is introduced into the gap between the two mutually adjacent first aircraft interior panels, wherein the infill strip is independent and distinct from the first aircraft interior panels and also independent and distinct from the gap covering device, such that the infill strip is separately installed at the first aircraft interior panels.

11. The aircraft interior component group according to claim 8, further comprising:
   at least one second aircraft interior panel disposed adjacent to the first aircraft interior panels and having a visible surface portion, which is received in a recess formed in a surface of the retaining portion of the gap covering device facing away from the visible portion, the recess being shaped such that the at least one second aircraft interior panel is received in the recess and abuts the retaining portion after installation of the gap covering device.

\* \* \* \* \*